No. 12,034. Reissued Sept. 23, 1902.

C. C. BRADLEY.

THILL COUPLING.

(Application filed June 7, 1902.)

WITNESSES:

H. C. Arthur

W. E. Chase

INVENTOR

Christopher C. Bradley

BY

Smith & Dinsdale

ATTORNEYS.

THE NORRIS PETERS CO., PHOTO-LITHO., WASHINGTON, D. C.

UNITED STATES PATENT OFFICE.

CHRISTOPHER C. BRADLEY, OF SYRACUSE, NEW YORK.

THILL-COUPLING.

SPECIFICATION forming part of Reissued Letters Patent No. 12,034, dated September 23, 1902.

Original No. 697,603, dated April 15, 1902. Application for reissue filed June 7, 1902. Serial No. 110,691.

DIVISION A.

*To all whom it may concern:*

Be it known that I, CHRISTOPHER C. BRADLEY, of Syracuse, in the county of Onondaga, in the State of New York, have invented new and useful Improvements in Thill-Couplings, of which the following, taken in connection with the accompanying drawings, is a full, clear, and exact description.

This invention relates to that class of thill-couplings in which the draft-eye is attached to the thill or pole iron and composed of an upper fixed jaw and a lower movable jaw, which latter is opened and closed by a lever pivoted to the thill or pole iron and a bar connected to the lever and engaged with the movable jaw. In this class of thill-couplings the fixed jaw is formed by the manufacturer integrally with a short section or stub, which forms part of the thill or pole iron, and to which section both the movable jaw and the lever are pivoted. This section or stub of the thill or pole iron is welded to the main part of the same by the carriage-maker and applied by him to the thill or pole. As the thill-iron is of considerable length and is curved to correspond with the curvature of the thill or pole arm, as the case may be, it is very difficult to properly bend the iron without changing the relative positions of the pivots of the lever and movable jaw, as when the lever is pivotally connected to the pole-iron this change in the relative positions of the pivots of the lever and jaw necessitates varying lengths of connections between the lever and jaw in order that the lever may be effective in its operation on the jaw through the medium of the bar.

The object of my invention is to obviate these difficulties resulting from variation in the relative positions of the pivots of the movable jaw and operating-lever by constructing a device in such manner that the jaw-actuating member is free to change its position with reference to the jaw in uniting the stub to the thill-iron with reference to the main part thereof or in bending the iron, thereby preventing the movable jaw from being thrown out of alinement with the fixed jaw.

To this end the invention consists in the combination, construction, and arrangement of the parts of a thill-coupling, as hereinafter fully described, and pointed out in the claims.

Figure 1:
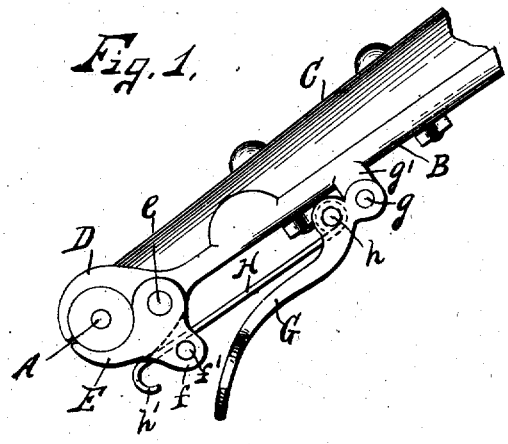
Figure 2:
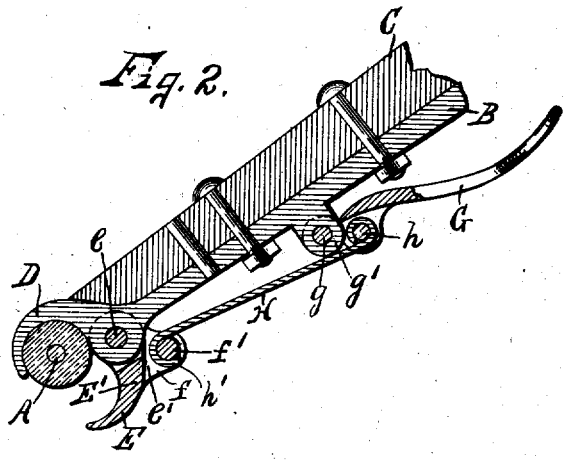
Figure 3:
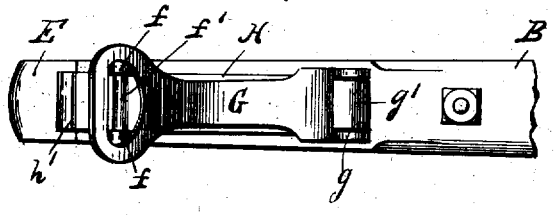

Referring to the drawings, Figure 1 is a side elevation of a thill-coupling embodying my invention, the jaws and operating parts being shown in their operative or closed position. Fig. 2 is a longitudinal vertical section through the parts seen in Fig. 1, the movable jaw and its operating member being shown in their inoperative or open position. Fig. 3 is an inverted plan of the parts seen in Fig. 1.

Similar reference characters indicate corresponding parts in all the views.

A represents a draft bolt or knuckle, which may be of any desired form or construction and attached to the front axle of a vehicle by any desired means.

B represents the stub or section of a thill-iron, and C the thill, to the under side of which the iron is secured in any well-known manner.

D represents the fixed jaw, which is formed integral with the stub or section B of the thill-iron at the rear end thereof and which engages over the draft bolt or knuckle A.

E represents the movable jaw, which is pivoted at its front end at $e$ to the thill-iron in front of the fixed jaw, so as to close against the under side of the draft bolt or knuckle.

Formed on the under side of the movable jaw E near its pivot $e$ are a pair of ears $f$, and secured in said ears at a short distance from the under side of the movable jaw is a transverse pin $f'$, located in such manner as to form a slot or guideway $e'$ between the pin and under side of the jaw.

G represents the lever by which the movable jaw is opened and closed and which is pivoted by a bolt $g$ to a lug $g'$, formed on the thill-iron B.

H represents an actuating-bar for the movable jaw E, said bar having one end pivoted at $h$ to one end of the lever G in proximity to the pivotal pin $g$, the opposite end of said bar H being inserted in the slot or guideway $e'$ between the pin $f'$ and adjacent face of the jaw E and is provided with a shoulder or hook-shaped extremity $h'$, which engages with the pin $f'$ and opens the jaw E when the lever G is moved forwardly, as seen in Fig. 2.

It is evident from the foregoing description that one end of the bar H is pivotally secured to the lever G and that its opposite end is free to move independently of the jaw E as the lever G is moved rearwardly after closing the movable jaw. In other words, the free end of the bar H engages the lower face of the jaw E with a sliding contact, thereby moving the hook extremity $h'$ beyond the pin $h$ when the operating-lever is moved rearwardly, as seen in Fig. 1.

Having thus described my invention, what I claim, and desire to secure by Letters Patent, is—

1. In a thill-coupling, the combination of a fixed jaw and a movable jaw, a lever, and a longitudinally-movable bar actuated by the lever and provided with means to open and close the movable jaw, said bar being enabled to change its position lengthwise with reference to the movable jaw.

2. In a thill-coupling, the combination of a fixed jaw, a movable jaw provided with a transverse slot, a lever, and a tightening-bar operated by said lever and arranged with its free end in the slot and capable of lengthwise movement therein for the purpose set forth.

3. In a thill-coupling, the combination of a fixed jaw, a movable jaw provided with a transverse slot, a lever, and a tightening-bar attached to said lever and arranged with its free end in the slot and capable of lengthwise movement therein, said free end having a projection for opening the jaw.

4. A thill-coupling comprising fixed and movable jaws, a lever having a fixed fulcrum, and means actuated by the lever and having a sliding engagement with and independently of the movable jaw to close the same for the purpose described.

5. A thill-coupling comprising fixed and movable jaws, a sliding bar engaging the jaw to close and open the same and having one end movable relatively to the jaw beyond its pivot when the jaw is closed, and means for operating the bar.

6. A thill-coupling comprising a fixed jaw and a movable jaw having a slot, a sliding member having one end movable in the slot relatively to the movable jaw and a lever having a fixed fulcrum and connected to slide said member for the purpose described.

7. A thill-coupling comprising a fixed jaw and a movable jaw having a slot, a lever having a fixed fulcrum, a bar having one end pivoted to the lever and its other end provided with a hook and movable in said slot independently of the movable jaw, the free end of the bar having a sliding contact with one of the walls of the slot to close the jaw as the lever is moved in one direction and the hook engaging the other wall of the slot to open the jaw as the lever is moved in the opposite direction.

Witness my hand this 4th day of June, 1902.

CHRISTOPHER C. BRADLEY.

In presence of—

JESSIE M. HAMMEKEN,
HOWARD P. DENISON.